Feb. 19, 1929.
J. A. McGREW
1,702,478
ENGINE FRAME CONSTRUCTION
Filed March 10, 1926 2 Sheets-Sheet 2
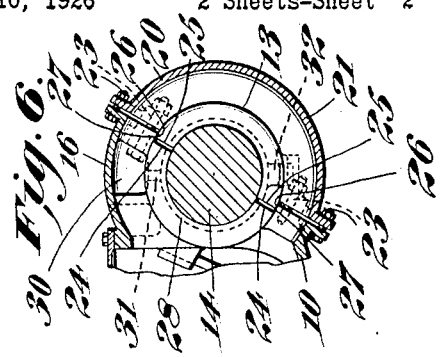
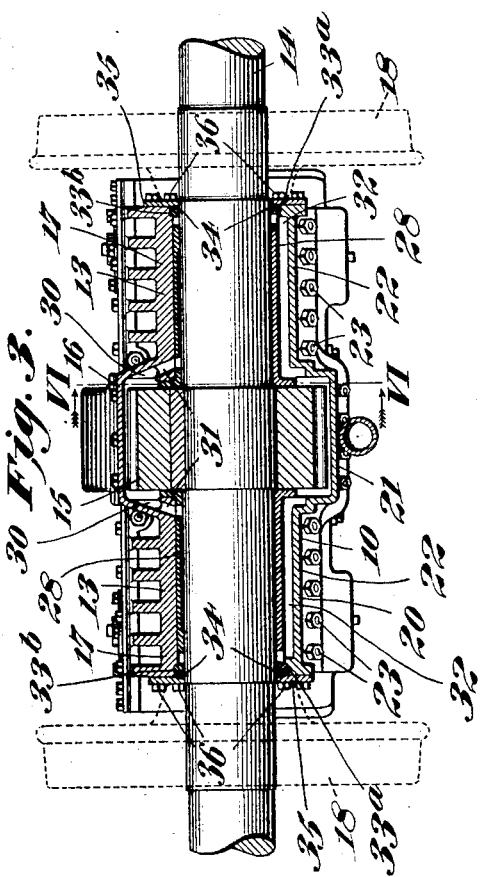
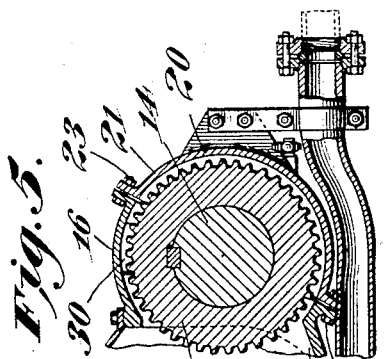
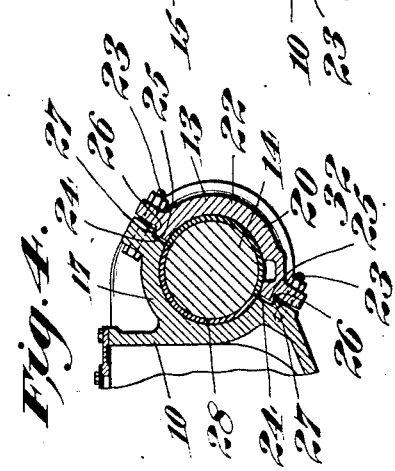
INVENTOR
John A. McGrew.
BY
R. S. C. Dougherty.
ATTORNEY Patented Feb. 19, 1929.

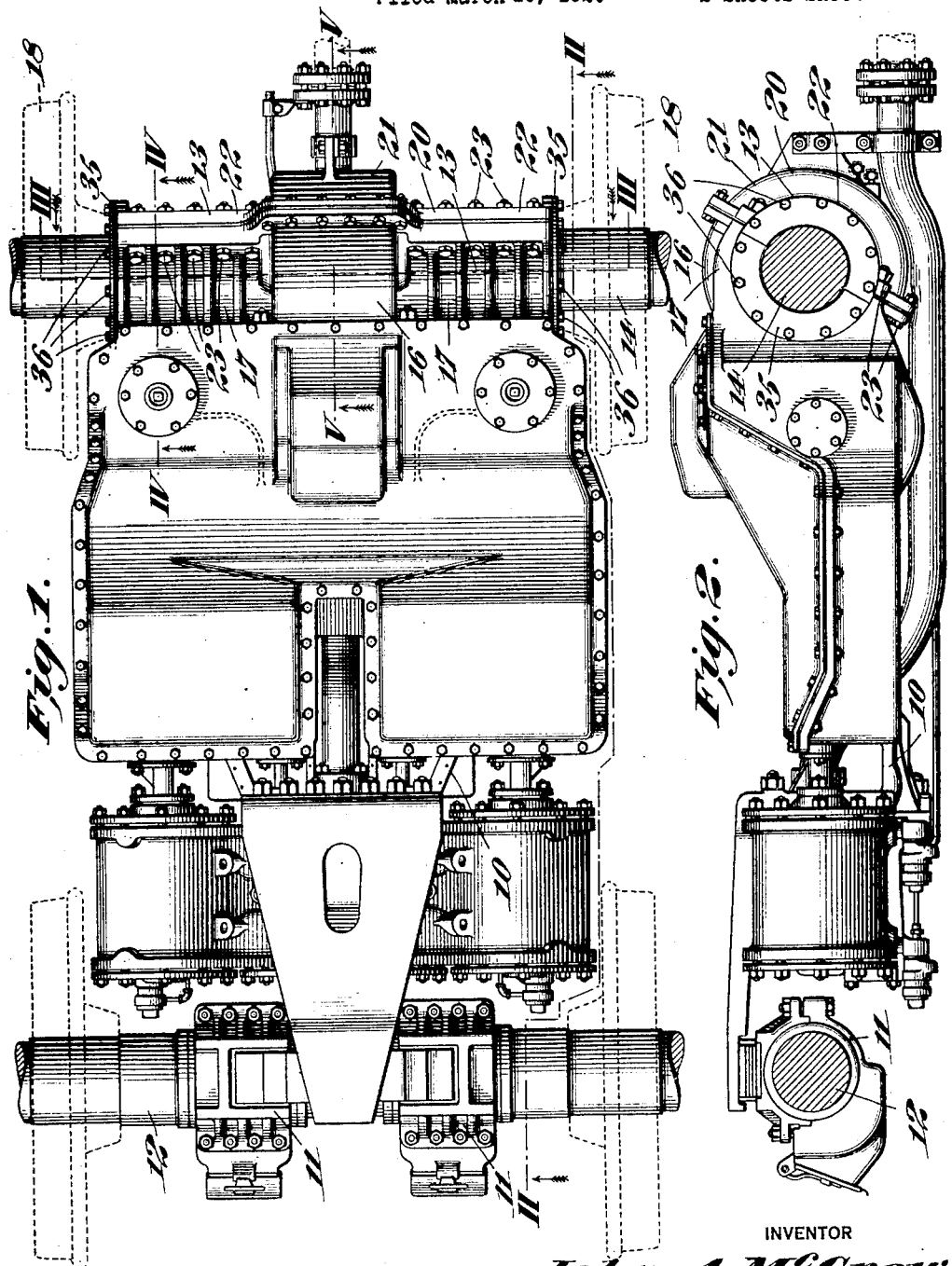

1,702,478

UNITED STATES PATENT OFFICE.

JOHN A. McGREW, OF ALBANY, NEW YORK, ASSIGNOR TO BETHLEHEM STEEL COMPANY.

ENGINE-FRAME CONSTRUCTION.

Application filed March 10, 1926. Serial No. 93,585.

My invention relates to motorized railway truck apparatus, and more particularly to bearing and gear case portions thereof, and it has for an object to provide apparatus of this character which shall be composed of few component parts and be of a simple and reliable design, which shall have the bearings lubricated from the gear case oil supply, and which shall be of such a design as to lend itself to construction by existing mechanical shop methods so that it shall be assured that the amount of labor and necessary operations involved in the construction shall be reduced and so that it shall be assured that the resulting construction may be assembled accurately.

With the type of locomotive auxiliary propulsion device mounted on a tender truck, such as disclosed and claimed in prior patents to James T. Loree and myself, for example, Patent No. 1,412,250, dated April 11, 1922, the auxiliary engine or motor frame was provided with separated gear case and bearing portions, the bearing portions resting on top of a load-bearing axle. Separate gear case and bearing caps were provided and each of the bearing caps had an oil well or reservoir. Since the gear case and bearing portions were separated, it was necessary to provide glands at opposite sides of the gear case and around the axle.

With the object in view of simplifying and making a better construction than that aforementioned, I have, in accordance with the present invention, devised an auxiliary engine or motor frame member having a gear case portion with bearing portions unitary or integral therewith and in open communication therewith, said portions opening outwardly at one end so that the gear case portion partially envelops the axle gear and the bearing portions partially envelop the load-bearing axle, together with a cap member having bearing and gear case portions, which are complementary to the first portions, the cap member being adapted to be secured to the auxiliary engine or motor frame member. This construction makes possible the provision of glands arranged at the outside ends or laterally of the bearings, thereby making the glands more accessible and also assuring that any oil which may possibly escape therefrom must first have passed through a bearing. With this type of construction, each of the contacting or engaging faces of the frame and cap members may be accurately machined in a single machine or set up, whereby accurate alignment of the parts is assured and manufacuring costs are reduced. In view of the unitary character of the gear case and bearing portions, it is possible to have the bearings lubricated by oil splashed up by the driven gear, the bearing portions preferably being provided with passageways whereby oil may be led to and drained back from the bearings.

These and other objects are effected by my invention as will be apparent from the following description and claims taken in connection with the accompanying drawings, forming a part of this application, in which:

Fig. 1 is a plan view of a motorized railway truck having my improvement applied thereto;

Fig. 2 is a sectional view taken along the line II—II of Fig. 1;

Fig. 3 is a sectional view taken along the line III—III of Fig. 1;

Fig. 4 is a fragmentary sectional view taken along the line IV—IV of Fig. 1;

Fig. 5 is a fragmentary sectional view taken along the line V—V of Fig. 1; and

Fig. 6 is a fragmentary sectional view taken along the line VI—VI of Fig. 3.

Referring to the drawings more in detail, I show an engine or motor frame, at 10, having a three-point suspension such as disclosed in the patent already referred to, the frame resting on a bearing 11 on a load-bearing axle 12, whereas the other end of the frame is provided with bearings 13 fitting the load-bearing axle 14.

The engine or motor devices carried by the frame 10 are adapted to drive the axle 14 in any suitable manner, the transmission therefor including a driven gear 15 fixed on the axle 14 and arranged between the bearings 13; and, since the engine structure and other related details constitute no part of my present invention, they will not be further referred to.

Referring to that portion of the frame 10 having the bearings 13 more in detail, it will be seen that the frame is comprised by a main body portion having an outwardly opening gear case portion 16 with outwardly opening bearing portions 17 integral therewith, the bearing portions being in open communication with the gear case portion. The gear case portion 16 partially envelops the driven gear 15 and the bearing portions 17 partially envelop the axle 14 between the wheels 18 thereof. A cap member 20 having a gear case portion 21 and bearing portions 22 complementary, respectively, to the gear case portion and bearing portions of the frame member is secured in place with respect to the latter by any suitable means, as by the bolts 23. In order that the cap member may be strongly joined to the frame member, I prefer to provide the split joint between these parts with what might be termed a tongue and groove connection. For example, the frame member may be recessed to provide a channel 24 for receiving a tongue portion 25 on the cap member, the lateral faces 26 of the tongue portion cooperating with internal lateral faces 27 of the channel portion to resist transverse movement of the cap member in the plane of the joint. With the bolts securely fastened, it will, therefore, be apparent that the cap member will be firmly and accurately secured in position.

The complementary bearing portions 17 and 22 are lined with brasses 28 of any suitable construction.

The complementary bearing portions 17 and 22 are preferably provided with means whereby oil splashed up from the gear case portion may be led to the bearings for lubricating the latter and excess oil drained back to the gear case. To this end I show the bearing portions 17 provided at their tops with pockets 30 facing the gear 15 and communicating with the bearings by downwardly-extending passages 31. Surplus oil is drained back from the outer ends of the bearings through channels 32 to the bottom of the gear case.

Gland constructions cooperate with the outer ends of the bearings in order to minimize the escape of oil therefrom. For this purpose, I show complementary recesses 33ᵃ and 33ᵇ in the cap member and frame member bearing portions to receive suitable gland material 34, the latter being held in such recesses by a cap plate construction 35 held in place by screws 36. The cap plate construction is preferably made in two parts in order to facilitate assembly, renewal, or adjustment of the gland construction.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described the invention what I claim as new and desire to secure by Letters Patent is:

1. The combination, with a railway truck having a load-bearing axle connected to load-sustaining wheels with a gear carried by the axle between the wheels, of a motor frame member having an outwardly opening gear case portion adapted to partially envelop said gear and having outwardly opening bearing portions in open communication with the gear case portion and adapted to partially envelop said axle at opposite sides of said gear to the hub of the wheels, a cap member having a gear case portion and bearing portions complementary to the first gear portion and bearing portions, a gland formed in the outer ends of the bearing portions and cap member and means for securing the cap member in place with respect to the frame member.

2. The combination, with a railway truck having a load-bearing axle connected to load-sustaining wheels with a gear carried by the axle between the wheels, of a motor frame member having an outwardly opening gear case portion adapted to partially envelop said gear and having outwardly opening bearing portions in open communication with the gear case portion and adapted to partially envelop said axle at opposite sides of said gear to the hub of the wheels, a cap member having a gear case portion and bearing portions complementary to the first gear portion and bearing portions, means for securing the cap member in place with respect to the frame member, and a split gland constructions carried by the outer ends of said bearing portions and cap member.

3. The combination, with a railway truck having a load-bearing axle connected to load-sustaining wheels with a gear carried by the axle between the wheels, of a motor frame member having an outwardly opening gear case portion adapted to partially envelop said gear and having outwardly opening bearing portions in open communication with the gear portion formed integral therewith and adapted to partially envelop said said axle at opposite sides of the gear, drain passages between the gear casing and bearing portions, a cap member having a gear case portion and bearing portions formed integral therewith and complementary to the first gear case portion and bearing portions, said bearing portions having their meeting faces provided with a tongue and groove construction for resisting transverse movement of the cap member, a gland formed in the outer ends of the bearing portions and cap members, a split cap plate for the gland attached to each of the ends of the bearing members and cap member and means for securing the cap member in place with respect to the frame member.

In testimony whereof I hereunto affix my signature this eighteenth day of February, 1926.

JOHN A. McGREW.